(No Model.) 5 Sheets—Sheet 1.

G. J. H. GOEHLER.
TIME LOCK.

No. 452,781. Patented May 26, 1891.

(No Model.)  5 Sheets—Sheet 2.

G. J. H. GOEHLER.
TIME LOCK.

No. 452,781. Patented May 26, 1891.

Witnesses:  
Wm. H. Dopp  
Al Stark

Inventor:  
George J. H. Goehler  
by Michael J. Ed. Wm Stark  
Attorneys.

(No Model.) 5 Sheets—Sheet 3.
G. J. H. GOEHLER.
TIME LOCK.

No. 452,781. Patented May 26, 1891.

Witnesses:

Inventor:
George J. H. Goehler
by Michael J. Ed. & Nic O. Stark
Attorneys.

(No Model.)  G. J. H. GOEHLER.  5 Sheets—Sheet 4.
TIME LOCK.

No. 452,781.  Patented May 26, 1891.

Witnesses:  Inventor:
Wm H. Dopp  George J. H. Goehler
Centie S. Stars  by Michael J. Ed Wm D. Stark
Attorneys.

(No Model.)  5 Sheets—Sheet 5.

G. J. H. GOEHLER.
TIME LOCK.

No. 452,781. Patented May 26, 1891.

Witnesses: Wm H. Dopp, Centie S. Stark

Inventor: George J. H. Goehler
by Michael J & Wm O Stark
Attorneys.

THE NORRIS PETERS CO., PHOTO-LITHO., WASHINGTON, D. C.

UNITED STATES PATENT OFFICE.

GEORGE J. H. GOEHLER, OF BUFFALO, NEW YORK, ASSIGNOR TO THE CARY SAFE COMPANY, LIMITED, OF SAME PLACE.

TIME-LOCK.

SPECIFICATION forming part of Letters Patent No. 452,781, dated May 26, 1891.

Application filed December 11, 1890. Serial No. 374,261. (No model.)

*To all whom it may concern:*

Be it known that I, GEORGE J. H. GOEHLER, of Buffalo, in the county of Erie and State of New York, have invented certain new and useful Improvements in Automatic Time-Locks for Safes and Vaults; and I do hereby declare that the following description of my said invention, taken in connection with the accompanying sheets of drawings, forms a full, clear, and exact specification, which will enable others skilled in the art to which it appertains to make and use the same.

This invention has general reference to automatic time-locks for safes and vaults; and it consists, essentially, in the novel and peculiar combination of parts and details of construction, as hereinafter first fully set forth and described, and then pointed out in the claims.

Figure 1:
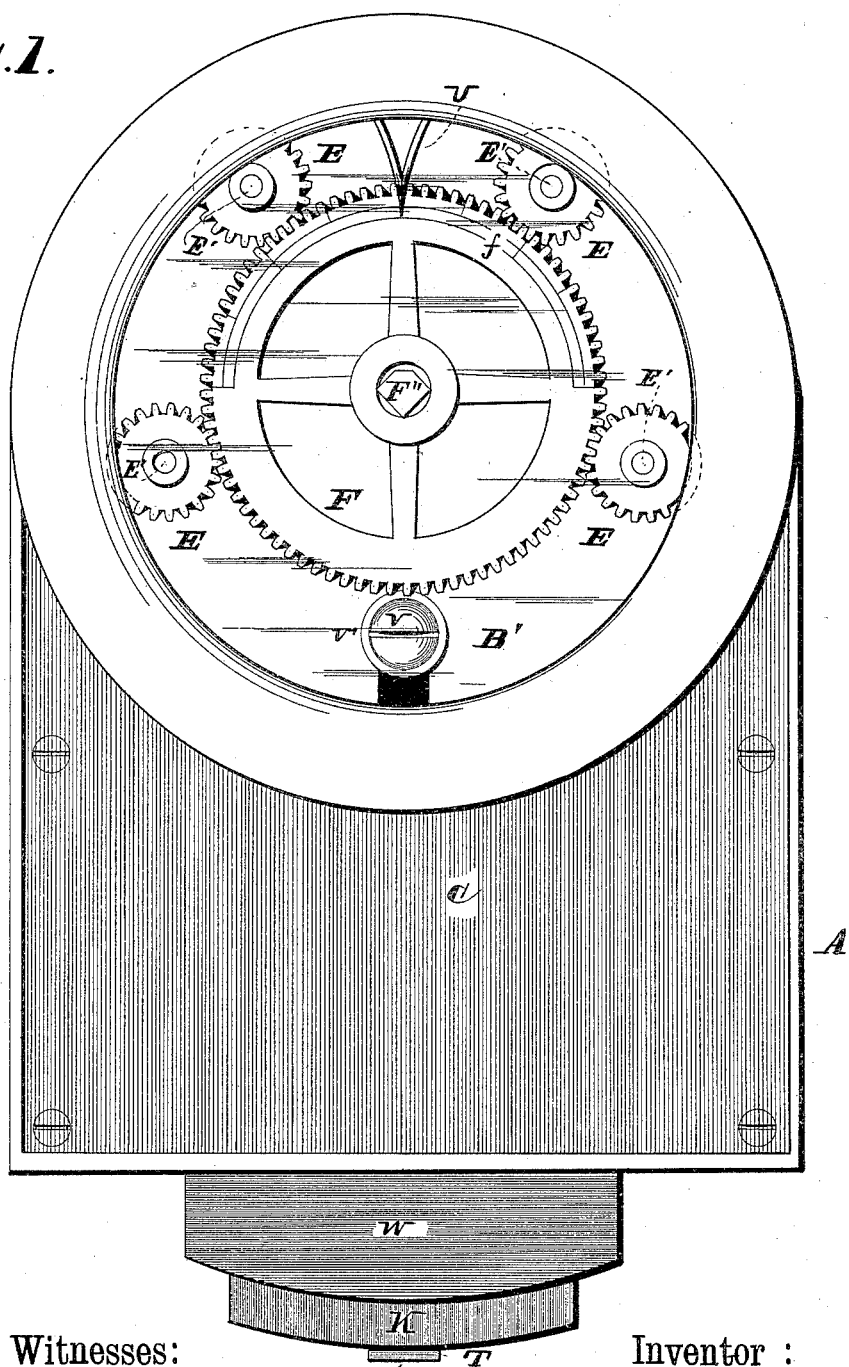
Figure 2:
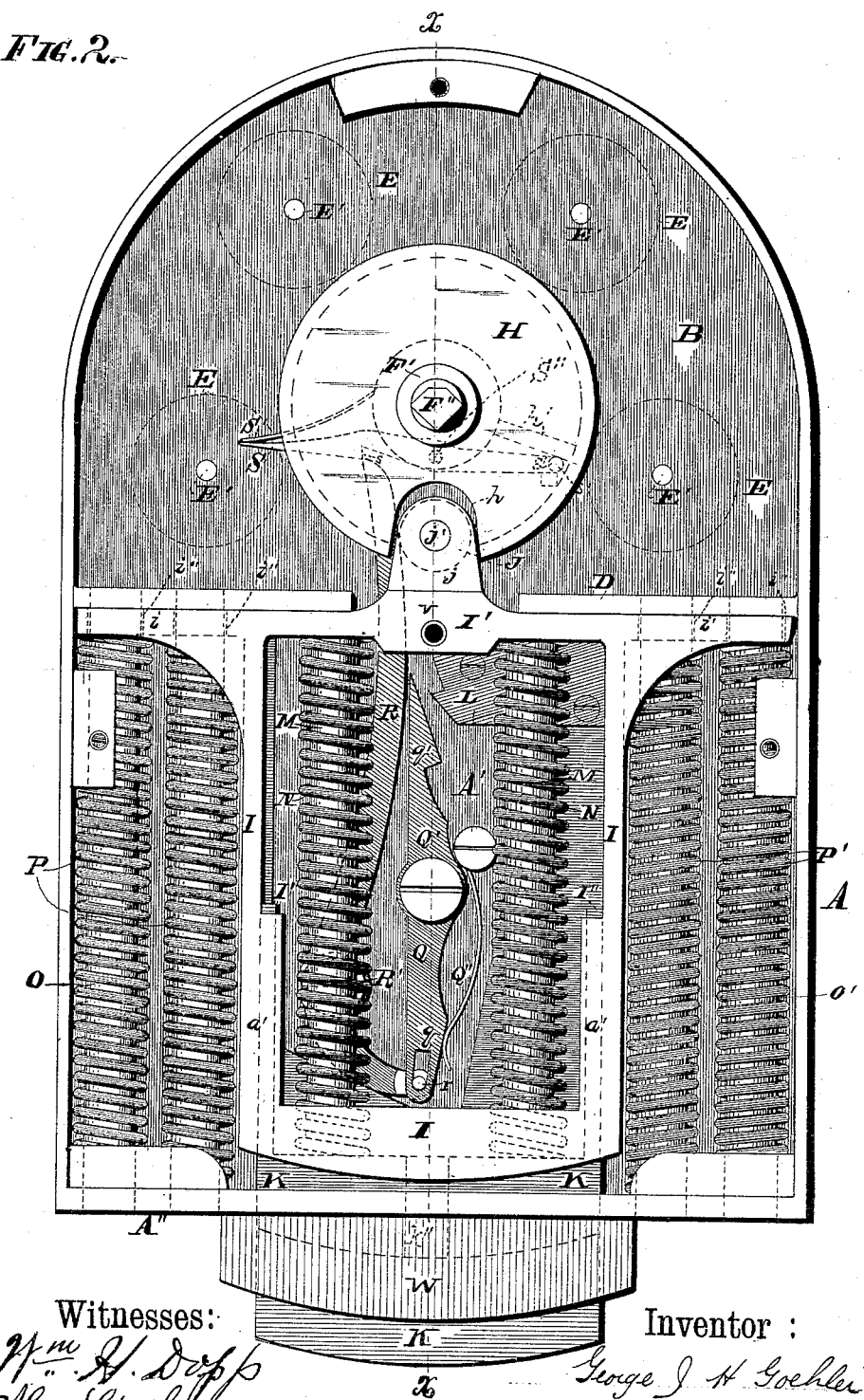
Figure 3:
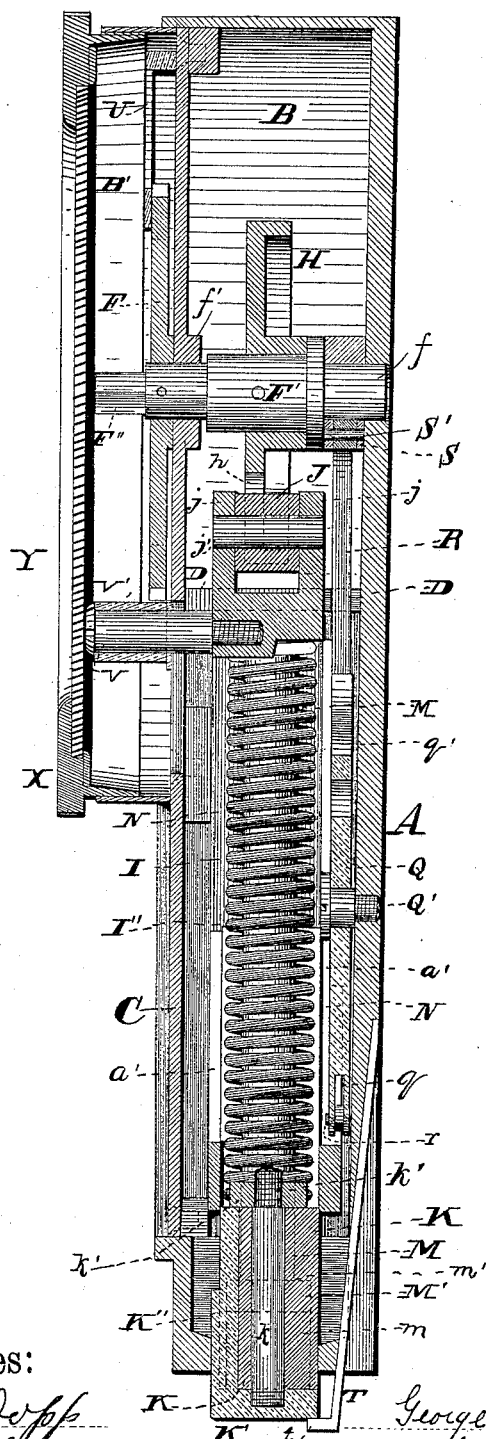
Figure 4:
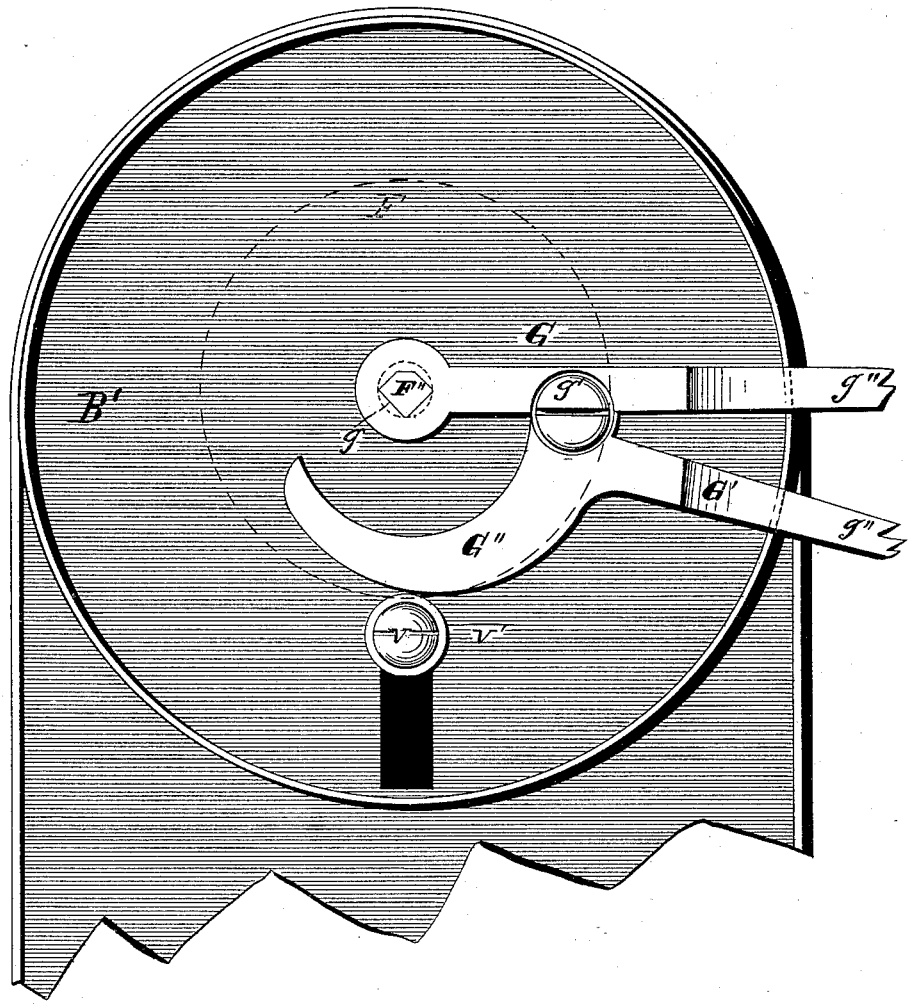
Figure 7:
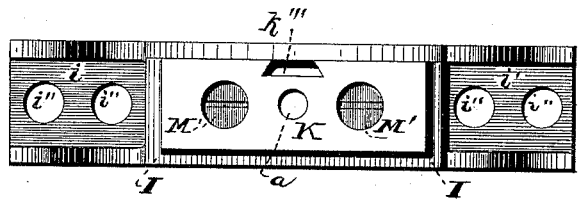
Figure 6:
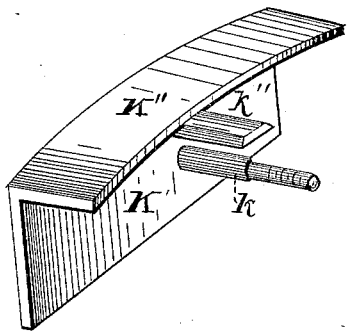
Figure 5:
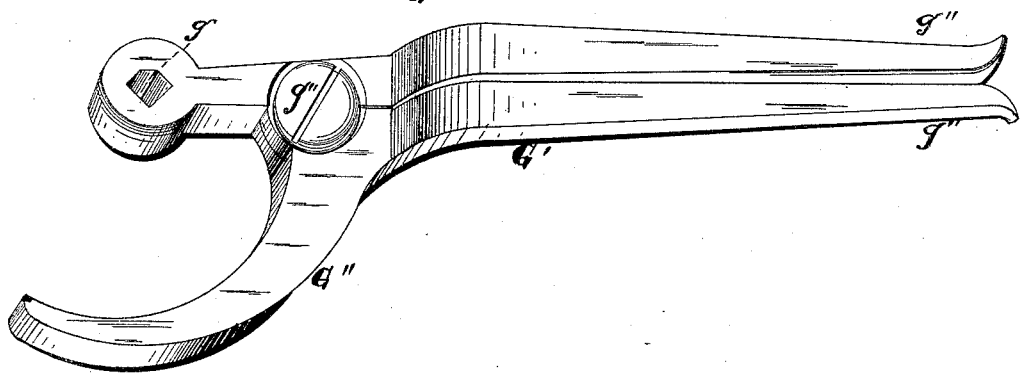

In the drawings already referred to, which serve to illustrate my said invention more fully, Figure 1 is a plan of my improved time-lock. Fig. 2 is a similar view with the face-plate of the time-lock removed. Fig. 3 is a transverse sectional elevation in line $x$ $x$ of Fig. 2. Fig. 4 is a plan of a portion of the lock, showing the winding and time-setting key in position. Fig. 5 is a perspective view of the key detached. Fig. 6 is a perspective view of the bolt-shoe detached. Fig. 7 is an end view of the bolt with the shoe removed.

Like parts are designated by corresponding letters of reference in all the figures.

The object of this invention is the production of an efficient and serviceable time locking and unlocking mechanism for safes and vaults. To attain these results I construct this time-lock essentially of a suitable casing A, of substantially rectangular form, terminating in a semicircular chamber B, and provide the same with a cover C, as clearly illustrated in Figs. 1 and 3.

Within the chamber B, which is separated from the rectangular chamber A' by a partition D, I locate four time-pieces or clocks, the hour-wheels E of which are located around a dial-wheel F, Fig. 1, and engaging therewith by their cogs in an obvious manner. This dial-wheel is fixed upon a spindle F', having one bearing in a boss $f$, formed on the bottom plate of the casing A, and another bearing in a boss $f'$, formed on the cover C, as shown in Fig. 3. The end of this spindle F' passing into the dial-casing B' is polygonal in shape or having its sides irregularly arranged for the application of a key G (shown in detail in Figs. 4 and 5) in one position only, as will hereinafter be more fully referred to. Upon the spindle F' is further located a disengaging-wheel H, which has in its periphery a deep notch $h$, and on its under side a bar $h'$, (shown in dotted lines in Fig. 2,) which said bar operates the release mechanism of the bolt-work, in a manner hereinafter described.

Within the chamber A' are located the bolt-frame, and within this frame the bolt proper. This bolt-frame consists of a rectangular structure I, having on its upper end two sidewise-projecting flanges $i$ $i'$, each of which is provided with two sets of holes $i''$, and centrally upon its cross-bar I' with two lugs $f$, within which is journaled a roller J by a pin $j'$, as illustrated in Figs. 2 and 3. The lower end of the bolt-frame has an angular opening through which the bolt proper K passes. The back of the bolt-frame is open in part, and near the upper end of this opening is located a catch L, Fig. 2, to operate in conjunction with a tripping mechanism, as further on described.

To the cross-bar I' of the bolt-frame are secured two downwardly-pendent studs M, having heads M' operating within holes $m$, located within the bolt proper K, said holes $m$ having shoulders $m'$, against which said heads M' of the studs M bear as long as the bolt proper is shot—*i. e.*, the lock in a locked condition.

Between the upper surface of the bolt proper and the lower surface of the cross-bar I' of the bolt-frame I and surrounding the studs M are spiral springs N, which push the bolt proper downwardly in the bolt-frame I. The lower end of the bolt proper is provided with a shoe K' to close the shouldered apertures $m$ in the bolt proper on their lower enlarged end, and through which the studs M are passed into said holes. This shoe K' has centrally a bolt $k$ passing through a central aperture $a$ in the bolt proper, (see Fig. 7,)

and a nut $k'$, by means of which the shoe is held to the bolt proper, a dovetailed tongue $k''$ on said shoe fitting a correspondingly-shaped groove $k'''$ in the face of the bolt proper K, (also shown in Fig. 7,) receiving this tongue to prevent the shoe from turning on its bolt $k$, while a flange $K''$ on said shoe, overlapping the face of the bolt proper, forms a stop to the upward movement of said bolt proper within the bolt-frame I. The bolt proper has two upwardly-projecting side pieces, which slide between projecting ribs $a'$ of the sides of the bolt-frame, so as to properly guide the bolt proper in said bolt-frame.

In the chamber $A'$, and on both sides of the bolt-frame, there are studs O passing through the lower side $A''$ of the casing A into the partition D in said casing and through the holes $i''$ in the flanges $i$ of the bolt-frame I. Spiral springs P P', bearing with one end upon the bottom side $A''$ and with the opposite end upon the flange $i$, push the bolt-frame I upwardly against the partition D in said casing A.

To the bottom of the chamber $A'$ is pivoted a trip-lever Q upon a fixed stud $Q'$, said trip-lever having on its upper end a hook $q'$ and on its lower end a slotted fork $q$, wherewith engages a pin $r$ on the disengaging-lever R, (shown in dotted lines in Fig. 2,) and which extends upwardly to within a short distance of the disengaging-wheel H.

In the chamber B there is located a dog S, pivoted upon a stud $S''$, said dog having on one end a hook $s$ and on its opposite end a pin $s'$, a blade-spring $S'$, acting upon the dog S near its hooked end, tending to press that end of the dog downwardly, while a similar blade-spring $Q''$, acting upon the trip-lever Q near the end having the slot-hole $q$, tends to push the opposite end of that lever having the hook $q'$ toward the hook L of the bolt-frame I.

On the casing A there is a spring-hook T, the lip $t$ of which engages the bolt proper below its shoe and holds the same up in an unshot position. This spring-hook T allows the bolt to drop as soon as it comes in contact with the frame of the safe or vault (not shown) in the well-known manner.

I shall now proceed to describe the operation of this lock mechanism, having first described its parts and assuming them in their normal position—i. e., when the safe is unlocked and the bolt proper and all the other parts in the position shown in Fig. 2. To prepare the lock for locking, I proceed as follows: A key, consisting of a tong-like implement G, (shown in detail in Fig. 8,) has one of its members provided with an eye $g$, fitting the polygonal end $F''$ of the spindle $F'$, its other member $G'$, which is pivoted to the member G by a bolt $g'$, having a curved arm $G''$, the center of which is located in the center of the polygonal eye when the two members G $G'$ are in contact with each other. The key is placed upon the polygonal section of the spindle $F'$, with the handles $g''$ of the key pushed apart, as shown in Fig. 4, so that the curved arm $G''$ bears upon a roller $V'$, placed upon a pivot V, located in the center of the cross-bar $I'$ of the bolt-frame I in a screw-threaded aperture $v$ therein, as shown in Figs. 1, 2, and 4. Now the key is closed by drawing the handles $g''$ together until they are in contact with each other. This causes the curved arm $G''$ to move away from the eye $g$ and to push the bolt-frame I by the roller $V'$ downward until the hook L, Fig. 2, reaches and engages the hook $q'$ on the trip-lever Q. This hook $q'$ will now hold the bolt-frame in its depressed position, while at the same time the spiral springs P, P', and N have been tensioned, the bolt proper being still held in its normal position by the spring-hook T and the disengaging-lever R engaged by the hook $s$ on the dog S. If now the key G is turned in the direction of the arrow in Fig. 4, the dial-wheel F, as well as the disengaging-wheel H, will be revolved in the same direction. This will have the effect of first winding all the time-pieces and of determining the time within which the bolt proper is to be released and retracted automatically. In the face of the dial-wheel F there are predetermined divisions $f$, while in the dial-chamber there is a pointer U. Now turning the dial-wheel, as described, to the number of hours after which the bolt proper is to unlock, and removing the key G from its arbor $F''$, allows the time-pieces to start and to run the dial-wheel and the disengaging-wheel in an opposite direction. The safe-door may now be closed, the spring-hook T releasing the bolt by its lip $t$ striking the door-frame or other object, when the bolt proper will be shot by the spiral springs N acting upon the same. The safe or vault is now locked and cannot be opened until the time-pieces have revolved the wheel H to a point where its bar $h'$, engaging the pin $s'$, depresses the dog S on that end and releases the upper end of the trip-lever R, which, acting upon the disengaging-lever Q, disengages its hook $q'$ from the hook L on the bolt-frame I, when the side springs P P', acting upon the latter, will raise the entire bolt-frame and the bolt proper back to their normal position and thereby allow the safe-door to be opened. If for any reason whatever one or more of the time-pieces should fail to operate, the remainder thereof will not thereby be affected, but continue to move the dial-wheel and the disengaging-wheel until at the proper time the bolt proper will be retracted, as described, it being understood that the time-pieces are so planned that as long as one of them is operating it will be powerful enough to turn the dial and disengaging-wheels in the manner described.

In starting the time-pieces it is desirable to first wind them with their individual keys, so that they will run for a short space of time—say an hour or two—when by turning the spindle F' with the key G in the manner described these time-pieces will be wound up the additional and entire time required to unlock the bolt. This would avoid the possibility of the time-pieces failing to run down to the exact moment when the bolt proper is to be released, and thus defeat the object in view. Whenever the lugs j on the bolt-frame enter the deep notch h in the disengaging-wheel H all the time-pieces will be stopped immediately. Hence it follows that the preliminary winding up of the time-pieces by their individual keys needs but once be performed unless the time-pieces are disturbed in a manner that would affect this preliminary winding up.

The disengaging-wheel is made circular and of a diameter that will allow it to revolve freely after the bolt-frame I has been depressed by the key G, and without its coming in contact with the roller J in the lugs j of the said bolt-frame. This has been thus constructed that should by external force, such as a discharge of an explosive upon the outside of the safe-door, cause the disengagement of the hook q' from the hook L the bolt-frame cannot be lifted by the springs P P' any higher than to bring the roller J in contact with the periphery of the disengaging-wheel H. This may produce friction and perhaps retard the time-pieces somewhat; but it will not prevent the bolt-frame and the bolt proper from being disengaged by the springs P P' as soon as the disengaging-wheel arrives at its normal position, because each of the time-pieces is powerful enough to revolve the dial and disengaging-wheels even after such friction has been applied. It will now be seen that the unlocking of the bolt proper is entirely automatic and is performed by the time-pieces, and that it will operate as long as one of the four time-pieces is operative, it being assumed that an instance where all the time-pieces would be inoperative could not well happen, especially so since the winding up of the time-pieces cannot be forgotten, because it is a part of the operation of preparing the lock for closing and because the bolt cannot be shot without the preliminary operation of depressing the bolt-frame, which also winds the time-pieces.

In the present specification I have at various occasions mentioned time-pieces (not shown in the drawings) and desire to say that such time-pieces are the usual marine or any other desirable clock mechanism driven by a spring or springs and having a balance-wheel and escape-movement in the usual manner. Such time-pieces are so well known that I do not deem it necessary to illustrate the same in detail, it being understood that I do not limit myself to any particular make or construction of such time-piece as long as its proper arbor is provided with the necessary pinion E to engage the dial-wheel F in the manner described. On the bottom side of the case A there is formed a boss W. Through this boss the bolt proper K is passed with its lower end and is therein guided in a proper manner. The dial-casing B' is closed by a rim X, having a glass plate Y, through which the dial-wheel with its pointer and the pinions may be seen. This, however, is non-essential and may be changed at pleasure without changing the nature of my invention.

In the foregoing specification I have described and in the drawings I have shown the bolt-frame as being operated by four spiral springs and the bolt proper by two of such springs. Of course a smaller or larger number of such springs may be used, the object of employing a multiplicity of such springs being to guard against the possibility of the device failing to operate in case one or the other of these springs should give out while the safe is locked, and thus fail to be operative at the critical moment, so that, all things considered, this mechanism is less liable to failure, or at least not more so than any other time mechanism now in use.

Having thus fully described my invention, I claim as new and desire to secure to me by Letters Patent of the United States—

1. In time-lock mechanism, the combination, with the casing, of a series of arbors having pinions of the time-pieces, as described, a dial-wheel having time-indications on its face, an arbor upon which said dial-wheel is mounted, a release-wheel having a deep notch upon said arbor, a stop on said release-wheel, levers, substantially as described, actuated by said stop, a bolt-frame held by said levers in a depressed condition, and springs for retracting the bolt-frame, as stated, for the object specified.

2. In time-lock mechanism, the combination, with the arbors of the time-pieces, of the pinions thereon, a dial-wheel engaging said pinions, an arbor upon which said dial-wheel is mounted, a polygonal section on said arbor, a bolt-frame, a journal-bolt in the cross-bar of said bolt-frame, a roller upon said journal-bolt, and a key having an eye engaging said polygonal section, and an arm arranged to depress the bolt-frame, as and for the object stated.

3. In a time-lock mechanism, the combination, with the casing having a partition, as described, of a bolt-frame having perforated flanges on its upper end, studs in said casing passing through said flanges, spiral springs surrounding said studs and acting upon said flanges, a catch on the bolt-frame, and suitable mechanism for retaining the bolt-frame in a depressed position, as stated.

4. In a time-lock mechanism, the combination, with a release-wheel having a circular rim and a deep notch in said rim, of a bolt-frame having lugs on its cross-bar and a roller pivoted in said lugs, mechanism for revolving the release-wheel, tripping mechanism actuated by said release-wheel, and springs for lifting the bolt-frame, as described, whereby when the bolt-frame has been released at an improper time the bolt is prevented from retraction, as stated.

5. In a time-lock mechanism, the combination, with the disengaging-wheel H, having the bar $h'$, of the dog S, having the central pivot $S'$, the pin $s'$ on one end and the hook $s$ on the opposite end, the disengaging-lever R, the trip-lever Q, pivoted to the disengaging-lever R at one end and provided with a hook $q'$ at the other end, the spring $Q''$, acting upon the trip-lever Q, the bolt-frame I, and the catch L on said frame, as specified.

6. In a time-lock mechanism, the combination, with a bolt-frame having flanges, as described, of the studs O O', spiral springs P P', surrounding said studs and acting upon said flanges, and a separate bolt proper within said bolt-frame, the shouldered studs M in said bolt-frame, the shouldered holes therein, and the spiral springs around said studs, the heads M' of said studs M engaging the shoulders $m'$ of said holes, as stated.

7. In a time-lock mechanism, the combination, with the spindle F', carrying the dial-wheel and the disengaging-wheel, of the polygonal section F'' on said spindle and the key for turning said spindle and depressing the bolt-frame, as set forth.

8. In a time-lock mechanism, the combination, with the spindle F', carrying the dial-wheel and the disengaging-wheel, of the polygonal section on said spindle and the key for turning said spindle and depressing the bolt-frame, said key consisting of a tong-like implement having the member G, provided with an eye having a polygonal aperture, and the member G', provided with a curved arm G'', said members G G' being pivoted together and operating in the manner as and for the purpose set forth.

In testimony that I claim the foregoing as my invention I have hereto set my hand in the presence of two subscribing witnesses.

GEORGE J. H. GOEHLER.

Attest:
MICHAEL J. STARK,
WM. O. STARK.